(No Model.)  2 Sheets—Sheet 1.

J. F. KELLER.
FERTILIZER DISTRIBUTER.

No. 265,674. Patented Oct. 10, 1882.

WITNESSES:
Fred. G. Dieterich.
Isaac W. Gibson

INVENTOR.
John F. Keller
By Daniel Breed ATTORNEY.

N. PETERS, Photo-Lithographer, Washington, D. C.

(No Model.) 2 Sheets—Sheet 2.
J. F. KELLER.
FERTILIZER DISTRIBUTER.
No. 265,674. Fig. 3. Patented Oct. 10, 1882.
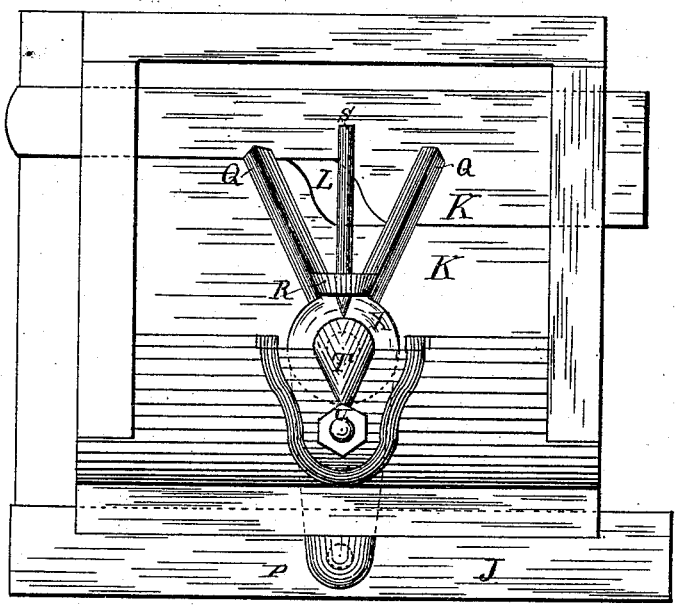
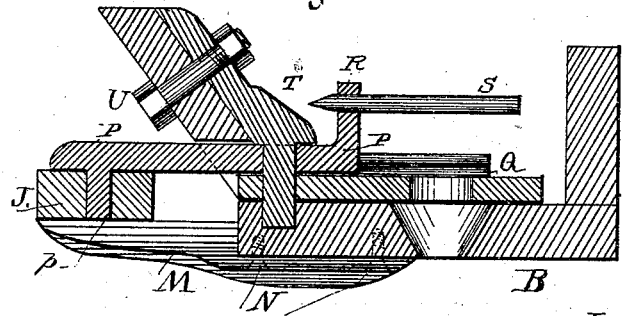
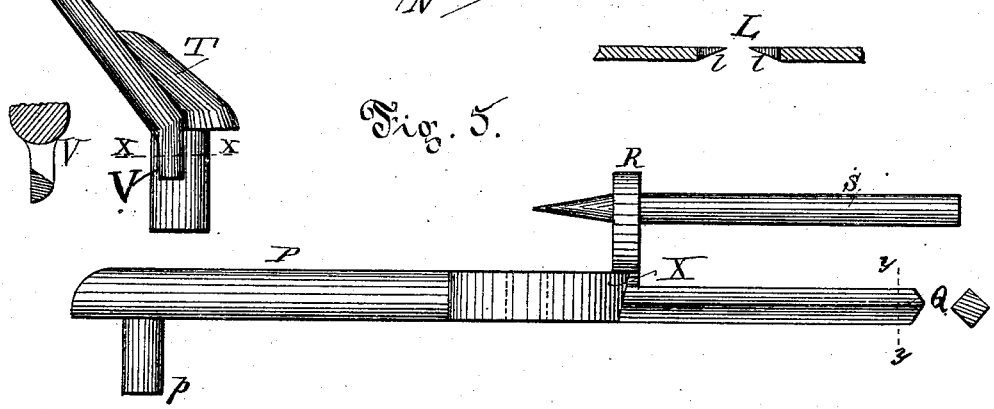
WITNESSES: Fred. G. Dieterich. Isaac T. Gibson.
INVENTOR. John F. Keller By Daniel Breed ATTORNEY.

UNITED STATES PATENT OFFICE.

JOHN F. KELLER, OF MARTINSBURG, WEST VIRGINIA.

FERTILIZER-DISTRIBUTER.

SPECIFICATION forming part of Letters Patent No. 265,674, dated October 10, 1882.

Application filed June 9, 1882. (No model.)

*To all whom it may concern:*

Be it known that I, JOHN F. KELLER, a citizen of the United States of America, residing at Martinsburg, in the county of Berkeley and State of West Virginia, have invented certain new and useful Improvements in Machines for Distributing Guano and other Fertilizers, of which the following is a specification, reference being had therein to the accompanying drawings.

The object of my invention is to simplify and make cheaper and more efficient the devices connected with the hopper of a machine for sowing or distributing guano and other fertilizers; and my invention consists in a novel construction of feed slides and stirrers and other improvements, all of which will be fully understood by the following description and claims.

Figure 1:
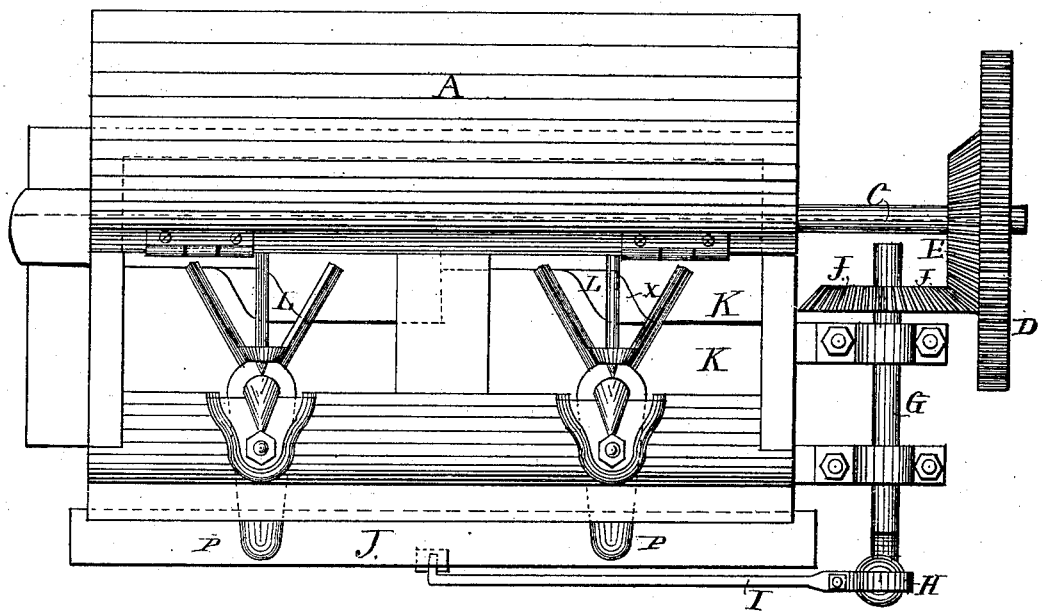
Figure 2:
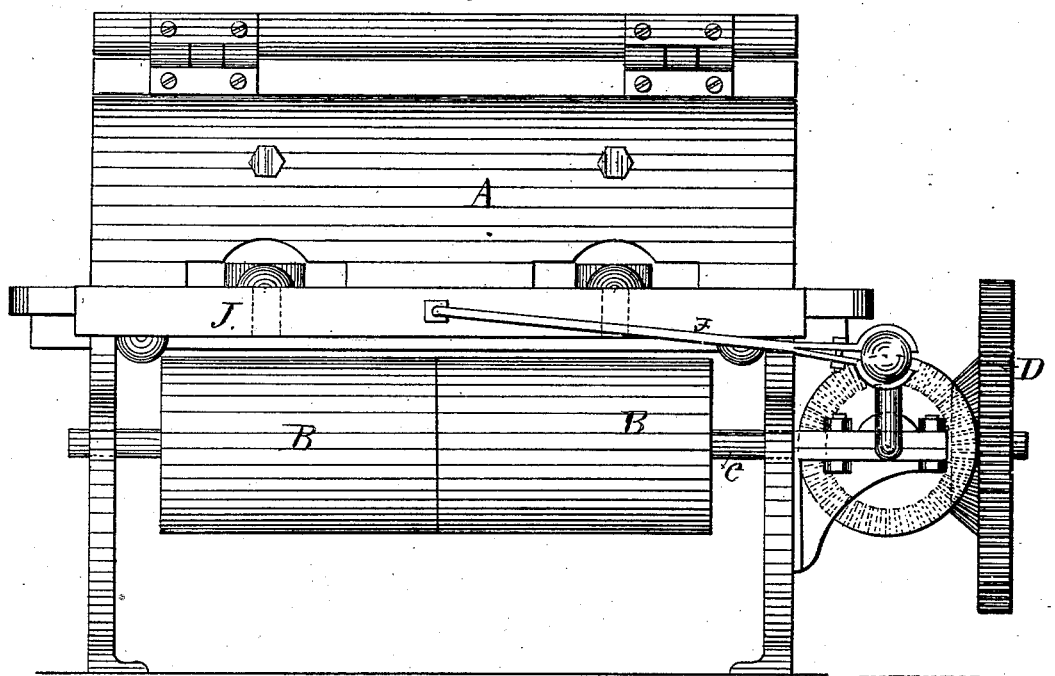

In the accompanying drawings, Figure 1 is a plan view of the hopper, gear-wheels, &c., of a guano-sower. Fig. 2 is a rear view of the same. Figs. 3, 4, and 5 are enlarged and detached views, showing my improvements.

In the drawings, A represents the hopper, to be supported on the frame in the usual manner, and provided with feed-rollers B upon the axle C, which is to be set in motion by means of the gear-wheel D, which engages with a gear-wheel to be carried on one of the driving-wheels in the usual manner. A bevel-gear wheel, E, engages with another bevel-gear wheel, F, and thus gives motion to shaft G and crank-wheel H, which in turn give an oscillating motion to the connecting-rod I and coupling stirrer-bar J, Fig. 1.

Now I will describe my new improvements.

In the bottom of the hopper the two feed-slides K have an S-shaped feed-opening, (shown at L, Fig. 1.) The slides are beveled from the under side, so as to make sharp edges on the feed-slides, which, in connection with fingers yet to be described, will cut away lumps of guano or other fertilizers which are liable to collect in the bottom of the hopper.

On the bottom of the hopper are strong cast-iron keepers M, fastened by wood-screws N, and the coupling-bar J rests and oscillates on these keepers. This bar has holes for the lugs or hooks *p*, cast on the stirrers P, the main portion of which is cast with the square steel fingers Q in the mold, thus making the fingers solid and inflexible with the casting. The arm or projection R is to be drilled and a third finger, S, inserted in the holes, as shown in Fig. 4. These stirrers are slipped into place in the hopper and securely fastened by means of the pivot-plates T, which are bolted to the hopper by means of a nut-bolt, U, and the stirrers in turn hold the coupling-bar, so the parts can all be removed by taking out the wood-screws N and the bolt U, which is a great convenience over the old construction. The stirrers P, with the fingers Q, are very long, and therefore not liable to tilt up in front. The pivot plate T holds the stirrers firmly on the bottom of the hopper, and the long leverage of the stirrer, projecting backward and resting on the coupling-bar J, which is firmly supported by the keepers M, holds the fingers Q to their work, and the sharp edge of the finger scrapes the bottom of the hopper and sweeps the feed-slides K and the S-shaped feed-opening, thus preventing the guano, &c., from sticking or pasting itself on the bottom of the hopper; and the feed-slides are beveled off on the under side, so as to make sharp edges *l*, Fig. 5, along the S-shaped feed-opening, and when any lumps of guano, &c., are pushed across the feed-openings the sharp edges of the slides cut away the under sides of these lumps, and thus make them smaller, till they drop out of the machine. In this way I remedy a bad defect of old machines, in which lumps are liable to accumulate and obstruct the feed, and in order to prevent the fertilizer from clogging the joint between the stirrer and edge of the hopper near the pivot-plate, I cast a sharp-edged projection, V, Fig. 5, on said plate. This sharp edge cuts away any accumulation of guano, &c., from the stirrers P, and these scrapings constantly fall out of the machine, keeping the joint clear.

Having described my invention, what I claim is—

1. The combination of the swinging stirrers P, provided with fingers Q, the pivot-plates T, attached to the hopper, the keepers M, and coupling-bar J, all arranged to operate together substantially as and for the purposes set forth.

2. The above-described stirrer, consisting of the cast-iron body P, molded upon the wroughtsteel fingers, said body having the hook $p$ and projection R cast thereon, and the finger S, inserted into said projection, substantially as and for the purposes set forth.

3. In a fertilizing-machine, the feed-slides K, forming the S-shaped feed-opening, and having the sharp edges $l$, Fig. 4, in combination with the steel fingers Q, having sharp edges, and mechanism for operating said fingers, substantially as and for the purposes set forth.

In testimony whereof I affix my signature in presence of two witnesses.

JOHN F. KELLER.

Witnesses:
DANIEL BREED,
W. C. DUVALL.